2,903,456
Patented Sept. 8, 1959

2,903,456
WERNER COMPLEXES OF METAL FORMATES

William D. Schaeffer, Pomona, Calif., assignor to Union Oil Company of California, Los Angeles, Calif., a corporation of California No Drawing. Application November 19, 1956
Serial No. 622,836

7 Claims. (Cl. 260—270)

This invention relates to certain new Werner complexes which are found to exhibit the unusual property of selectively absorbing, or "clathrating," ortho-xylene into their crystal structure in preference to the other xylene isomers. They may hence be employed for separating o-xylene from mixtures containing any one or more of the other C–8 aromatic isomers.

The new complexes consist of certain metal formates coordinated with substantially four moles of 4-methyl pyridine or 4-ethyl pyridine. They may be designated by the following general formula:

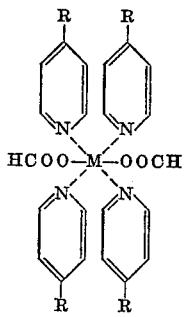

wherein M is a metal of atomic number 25 to 28 (i.e. manganese, iron, cobalt or nickel), and R is methyl or ethyl.

When any of the above complexes are triturated with, or precipitated in the presence of, a liquid mixture of isomeric xylenes, it is found that the o-xylene is selectively integrated into the crystal structure, forming what is presently regarded as a "clathrate." The solid clathrate may then be separated from the liquid phase, and decomposed with acid or heat to recover the selectively clathrated hydrocarbon.

The new complexes may be easily prepared by simply admixing the proper mole-ratios of metal formate and the pyridine base, normally at room temperatures, although higher or lower temperatures may be employed. If desired the metal formate may be first dissolved in a solvent such as water, and the complex precipitated by addition of the pyridine base. The complexes are somewhat soluble in water, but chilling will cause precipitation of the bulk of the complex, if saturated solutions of the formates are initially employed.

When working in aqueous solutions, it is not essential to start with pure metal formates. Any soluble salt which forms a more soluble complex with the pyridine base than does the formate may be initially dissolved in the solvent; formate ions are then added, and finally the pyridine base, whereupon the less soluble formate complex is selectively precipitated in accordance with the laws of mass action. The complexes of the metal halides are much more soluble in water than the corresponding formates, and hence it is convenient to use solutions of metal chlorides or bromides as starting materials, first adding formic acid, or a soluble formate, then adding the desired pyridine base. The resulting precipitate is then recovered by filtration, washed with ether or other appropriate solvent, and dried at low temperatures, e.g. 25°–100° C. Higher temperatures are likely to cause decomposition.

EXAMPLE I

About 26.8 gms. (0.125 mole) of nickel chloride ($NiCl_2 \cdot 6H_2O$) was dissolved in 30 ml. of warm water, and 11.5 gms. (0.25 mole) of formic acid added thereto. To the resulting solution was then added 53.5 gms. (0.5 mole) of 4-ethyl pyridine. An immediate green precipitate was formed and considerable heat evolved. The slurry was cooled and filtered, and the precipitate washed with dioxane and ether, and finally air dried at room temperature. The yield was 28% of theoretical, and the melting point was 161° C. with some decomposition. By elemental analysis the product was found to contain: C—62%, H—7.0%, N—9.7%, Ni—8.1%, and was hence nickel tetra(4-ethyl pyridine) diformate.

By substituting mole-equivalent proportions of manganese, iron or cobalt chlorides for nickel chloride in the above example, or 4-methyl pyridine for 4-ethyl pyridine, the corresponding Werner complexes are obtained in similar yields and purities. The resulting complexes are:

| Complex | Physical Appearance |
|---|---|
| 1. Manganous tetra (4-ethyl pyridine) diformate | White Solid. |
| 2. Ferrous tetra (4-ethyl pyridine) diformate | Tan Solid. |
| 3. Cobalt tetra (4-ethyl pyridine) diformate | Pink Solid. |
| 4. Nickel tetra (4-methyl pyridine) diformate | Blue Solid. |
| 5. Manganous tetra (4-methyl pyridine) diformate | White Solid. |
| 6. Ferrous tetra (4-methyl pyridine) diformate | Tan Solid. |
| 7. Cobalt tetra (4-methyl pyridine) diformate | Pink Solid. |

All of the above complexes exhibit selective clathrating properties for o-xylene, similar to that shown in the following example:

EXAMPLE II

About 8 gms. of the complex prepared in Example I was dissolved with heating in a solvent consisting of 20 ml. of methyl cellosolve and 1 ml. of 4-ethyl pyridine. Ten ml. of mixed xylenes were then added and the solution was cooled whereupon a light green precipitate was formed, which was recovered by filtration and washed with 20 ml. of isooctane. The precipitate was then dissolved in 20 ml. of dilute (50/50) HCl, and the solution was shaken with 40 ml. of isooctane to extract the liberated xylene. The hydrocarbon phase was separated and washed with HCl and water and dried over $Na_2SO_4$. Ultra-violet spectranalysis of the hydrocarbon phase, and of the original xylene, showed that the isomer distribution was as follows:

Table 1

| | Volume, Percent | | | |
|---|---|---|---|---|
| | p-xylene | m-xylene | o-xylene | Et. Bz. |
| Feed | 19.9 | 45.5 | 19.3 | 15.3 |
| Hydrocarbon from Clathrate | 8.0 | 20.1 | 53.1 | 18.8 |

In addition to their use as clathrate-formers, the complexes are also useful in other fields as e.g. insecticides, oil-soluble metal carriers, oxidation accelerators for paints and the like. Their solubility in many organic solvents, e.g. chloroform, renders them useful as impregnants for intimately depositing catalytic metals on hydrophobic surfaces as e.g. activated carbon and the like. Other uses will be apparent to those skilled in the art.

This application is a continuation-in-part of my prior application Serial No. 466,938, filed November 4, 1954, now U.S. Patent No. 2,827,463.

Other specific complexes, methods of preparation and uses will readily occur to those skilled in the art. The true scope of the invention is intended to be embraced by the following claims.

I claim:

1. A Werner complex having the formula:

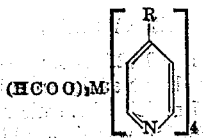

wherein M is metal of atomic number 25 to 28 inclusive, and R is selected from the group consisting of methyl and ethyl.

2. A Werner complex composed of one mole of a formate of a metal of atomic number 25 to 28 inclusive, coordinated with substantially four moles of 4-ethylpyridine.

3. Nickel tetra(4-ethyl pyridine) diformate.
4. Cobalt tetra(4-ethyl pyridine) diformate.
5. Manganese tetra(4-ethyl pyridine) diformate.
6. Ferrous tetra(4-ethyl pyridine) diformate.
7. Nickel tetra(4-methyl pyridine) diformate.

References Cited in the file of this patent

FOREIGN PATENTS 492,660    Great Britain  ---------- Sept. 20, 1938

OTHER REFERENCES

Ploquin: Compte rend. vol. 233, pp. 162–164 (1951).
Hanoberry: J. Econ. Entomology, vol. 35, pp. 915–918 (1942).
Smith: J.A.C.S., vol. 75, pp. 2010–2012 (1953).
Logan: J.A.C.S., vol. 74, pp. 4194–4195 and 5224–5 (1952).